Patented July 12, 1932

1,866,964

UNITED STATES PATENT OFFICE

STEWART J. CARROLL, OF ROCHESTER, NEW YORK, ASSIGNOR TO EASTMAN KODAK COMPANY, OF ROCHESTER, NEW YORK, A CORPORATION OF NEW YORK

CELLULOSE ACETATE COMPOSITIONS CONTAINING MIXED VOLATILE SOLVENTS

No Drawing.   Application filed April 23, 1927. Serial No. 186,188.

This invention relates to cellulose acetate compositions containing mixed volatile solvents. One object of the invention is to provide cellulose acetate compositions in which there is employed a mixture of volatile solvents, the mixture having a greater solvent power for the cellulose acetate than the sum of the solvent powers of the ingredients taken separately. Another object of the invention is to provide flowable film-forming compositions containing cellulose acetate and having correct viscosity at usual operating temperatures and being sufficiently concentrated to form the films with the minimum use of volatile solvents. Still another object of the invention is to provide a volatile solvent mixture by means of which film-forming dopes of correct viscosity and concentration can be formed, even out of those types of cellulose acetate which form too viscous solutions when dissolved in acetone alone to film-making strength. Other objects will hereinafter appear.

In the manufacture of cellulose acetate films, the cellulose acetate is often dissolved in acetone, along with some substance of low volatility which remains in the film as a plastifier or colloidizer. These dopes must come within factory tolerances, as regards viscosity at the film-making temperature so as to flow onto the polished film-forming surface at the correct speed and must likewise have sufficient concentration so that the film on said surface, left by the evaporation of the acetone, will have the correct thickness. Different batches of cellulose acetate sometimes vary in their properties and occasionally there will be obtained a kind of cellulose acetate, which is soluble in acetone, but which gives too viscous solutions when made up to the proper strength for film formation, or else it gives solutions of insufficient concentration, when enough acetone is used to obtain a working viscosity. Since films produced from such high viscosity cellulose acetates are of good quality, it is highly desirable to work the latter into flowable film-forming compositions having simultaneously the correct viscosity and concentration.

I have found that this result may be obtained by dissolving the cellulose acetate in a mixture of volatile solvents,—namely, methyl acetate, ethyl acetate and acetone. Moreover, I have found that this mixture operates particularly effectively when its ingredients are present within certain ranges of proportions. While all of these ingredients have been proposed separately as volatile solvents for some kinds of cellulose acetate, the fact that a mixture of them has a greater solvent power, even for high viscosity cellulose acetates, than the sum of the solvent powers of the ingredients, when used separately, has not, so far as I am aware, been heretofore observed. While the super-solvent action of the mixture is particularly useful in connection with the cellulose acetates which form too viscous solutions in acetone, nevertheless, this increased solvent action manifests itself towards all of the customary film-making grades of hydrolyzed or acetone-soluble cellulose acetate. It makes usable for film manufacture by the customary apparatus and processes some batches of cellulose acetate, which would otherwise be unusable. And with batches of cellulose acetates which are normally usable in such apparatus and methods, it makes possible the employment of the minimum amount of volatile solvents, thus lessening the quantity of these materials to be recovered.

I shall now give examples of my invention, but it will be understood that the latter is not limited to the details thus given, except as indicated in the appended claims. 100 parts of the volatile solvent mixture are prepared by mixing 50 parts by weight of methyl acetate with 10 to 40 parts of ethyl acetate and 40 to 10 parts of acetone. While good results may be obtained anywhere within the ranges of proportions indicated, an especially useful mixture contains 50 parts of methyl acetate, 40 parts of ethyl acetate and 10 parts of acetone by weight.

Into the above prepared mixture there is thoroughly stirred until dissolved the necessary amount of the cellulose acetate and the required proportion of the plastifier of low volatility. Any of the well known cellulose acetate film plastifiers may be employed, such as monochlornaphthalene, triphenyl phosphate, tricresyl phosphate, substituted benzol and toluol sulfonamids, etc., but I have found a plastifier comprising a mixture of 90 parts of triacetin to 10 parts by weight of monoacetin to be especially effective. In the preferred form of my invention, 100 parts by weight of the acetone-soluble cellulose acetate, either in powdered, fibrous, flaked, or other usual form, are dissolved in 300 parts of the above described volatile solvent mixture, and 30 parts by weight of the mixed acetin plastifier. While the use of 300 parts of the volatile solvent for 100 parts of the cellulose acetate gives the maximum economy in the use of solvents, the use of 500 parts of the solvent mixture to 100 parts of the cellulose acetate gives a perfectly workable dope. Moreover, the proportion of plastifier may vary from 5 to 50 parts.

Having thus described my invention, what I claim as new and desire to secure by Letters Patent is:

1. A flowable film-forming composition comprising acetone-soluble cellulose acetate dissolved in a volatile solvent mixture of 50 parts by weight of methyl acetate, 10 to 40 parts of ethyl acetate and 40 to 10 parts of acetone, said solution containing in the order of 30% cellulose acetate.

2. A flowable film-forming composition comprising 100 parts by weight of hydrolyzed cellulose acetate difficultly soluble in acetone and 5 to 50 parts by weight of a plastifier of low volatility dissolved in 300 to 500 parts by weight of a volatile solvent mixture, 50 per cent of which is methyl acetate, 10 to 40 per cent of which is ethyl acetate and 40 to 10 per cent of which is acetone.

3. A flowable film-forming composition comprising 100 parts by weight of hydrolyzed cellulose acetate difficultly soluble in acetone, 300 parts by weight of a volatile solvent mixture and 30 parts by weight of a plastifying mixture, said volatile solvent mixture being 50 per cent methyl acetate, 40 per cent ethyl acetate and 10 per cent acetone and said plastifying mixture being 90 per cent triacetin and 10 per cent monoacetin.

4. A flowable film forming composition comprising acetone soluble cellulose acetate dissolved in a volatile solvent mixture comprising substantially 50 parts by weight of methyl acetate, 40 parts of ethyl acetate and 10 parts of acetone.

5. A flowable film forming composition comprising hydrolyzed cellulose acetate difficultly soluble in acetone and a plastifier of low volatility dissolved in a volatile solvent mixture comprising substantially 50 parts by weight of methyl acetate, 40 parts of ethyl acetate and 10 parts of acetone.

6. A volatile solvent comprising a homogeneous mixture of approximately 50 parts of methyl acetate, 10 to 40 parts of ethyl acetate and 40 to 10 parts of acetone.

7. A volatile solvent comprising a homogeneous mixture of approximately 50 parts of methyl acetate, 40 parts of ethyl acetate and 10 parts of acetone.

Signed at Rochester, New York, this 11th day of April, 1927.

STEWART J. CARROLL.